Figure 1:
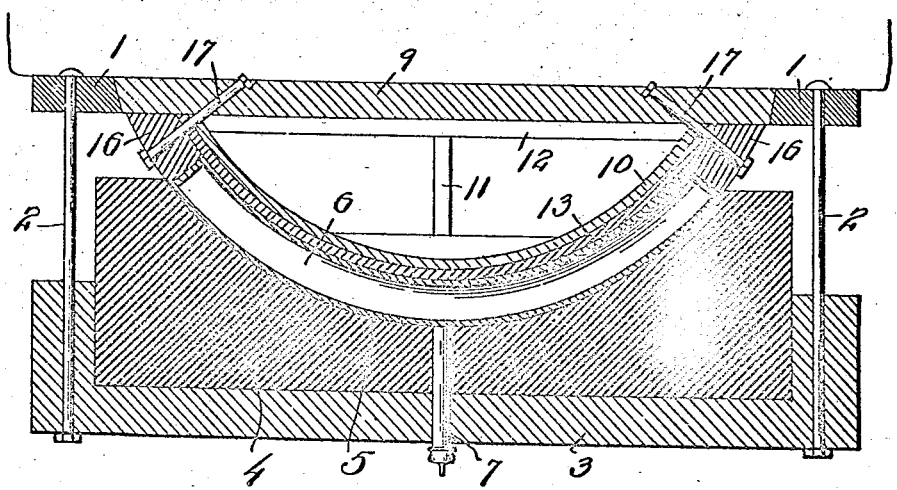

J. J. DOWNEY.
CAR SEAT CUSHION.
APPLICATION FILED JULY 11, 1907.

899,034.

Patented Sept. 22, 1908.
2 SHEETS—SHEET 1.

Witnesses

Inventor
James J. Downey
By [signature]
Attorneys

J. J. DOWNEY.
CAR SEAT CUSHION.
APPLICATION FILED JULY 11, 1907.

899,034.

Patented Sept. 22, 1908.
2 SHEETS—SHEET 2.

Witnesses

Inventor
James J. Downey
By
Attorneys

UNITED STATES PATENT OFFICE.

JAMES J. DOWNEY, OF GLOUCESTER, MASSACHUSETTS.

CAR-SEAT CUSHION.

No. 899,034.          Specification of Letters Patent.          Patented Sept. 22, 1908.

Application filed July 11, 1907. Serial No. 383,265.

*To all whom it may concern:*

Be it known that I, JAMES J. DOWNEY, a citizen of the United States, residing at Gloucester, in the county of Essex, State of Massachusetts, have invented certain new and useful Improvements in Car-Seat Cushions; and I do hereby declare the following to be a full, clear, and exact description of the invention, such as will enable others skilled in the art to which it appertains to make and use the same.

This invention relates to new and useful improvements in car seats and it has particular reference to the resilient suspensions thereof.

The invention proposes a cushioning device comprised of coacting rubber sections and it has for its object to provide a novel construction, combination and arrangement of parts.

The details of construction will be readily understood from a consideration of the following detailed description, and its preferred embodiment is illustrated in the accompanying drawings in which like parts are designated by corresponding reference numerals in the several views.

Figure 2:
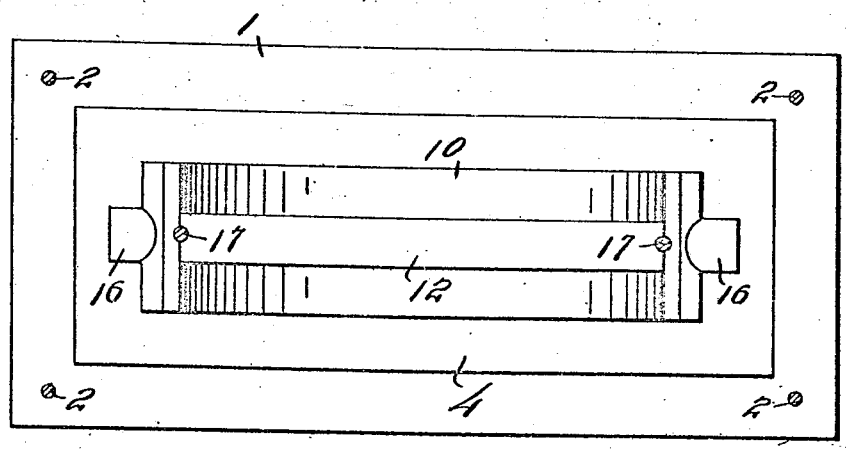
Figure 3:
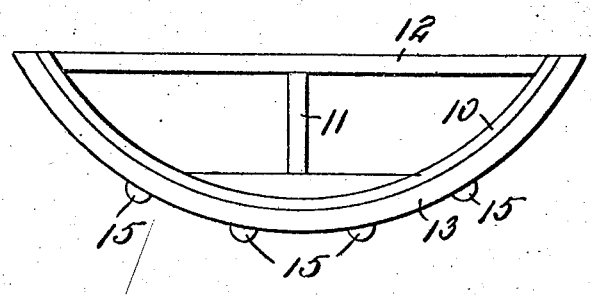
Figure 4:
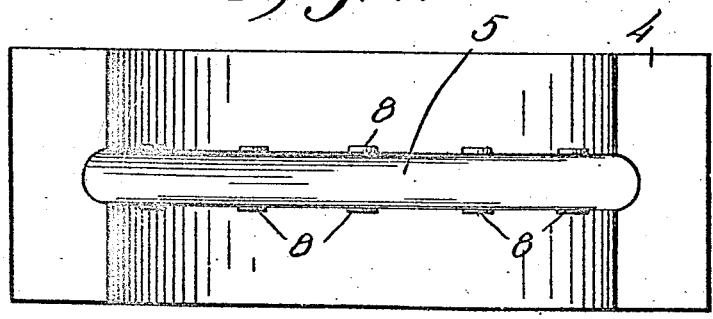
Figure 5:
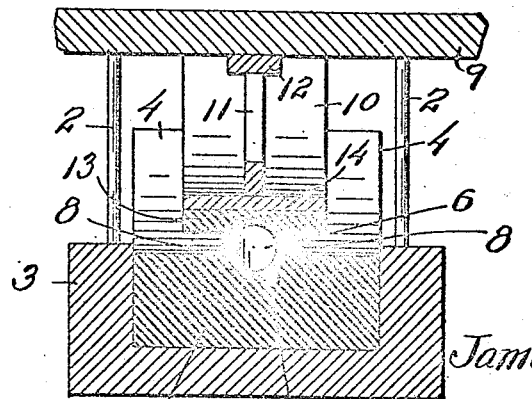

Of the said drawings, Figure 1 is a sectional view illustrating the construction of a car seat embodied in the present invention, Fig. 2 is a top plan view thereof, Fig. 3 is a detail view of a reinforcing frame carried by the seat proper, Fig. 4 is a detail view of a solid rubber cushion, and, Fig. 5 is a cross section of the car seat.

In the accompanying drawings, the numeral 1 denotes the seat frame from which is supported by depending tie bolts 2, a transverse beam 3 having its upper face recessed to receive a block 4 of solid rubber. The latter has its upper face concaved and longitudinally grooved as at 5 to afford a seat for a semi-annular rubber tube 6, the valve of the latter being mounted in the usual pipe 7, which projects through the block 4. The said block 4 likewise carries laterally projecting clips 8, which engage the tube 6.

The seat is designated generally by the numeral 9, and carries a depending bow-shaped member 10, reinforced with relation to the seat by a vertical brace 11, the sides of the member 10 being reinforced with relation to one another by a transverse brace 12. The member 10 carries a solid rubber facing 13 on its convex surface, and the said facing is grooved as at 14, and provided with laterally projecting clips 15, to engage the tube 6. The seat 9 also carries at its ends rubber blocks 16 held by bolts 17 and which engage the ends of the tube 6.

What is claimed, is,

1. In a device of the character described, the combination of a block having a recess in a face, an inflatable tube within the recess, a seat, a member depending from the seat resting on the tube, and blocks carried by the seat contacting with the ends of the tube.

2. In a device of the character described, the combination of a block of yielding material having a recess in a face, an inflatable tube within the recess, a seat, a member depending from the seat resting on the tube, and blocks of yielding material carried by the seat contacting with the ends of the tube.

In testimony whereof, I affix my signature, in presence of two witnesses.

JAMES J. DOWNEY.

Witnesses:
     ARTHUR H. WONSON,
     RICHARD S. HINCKLEY.